US012701332B2

(12) United States Patent
Chen et al.

(10) Patent No.: US 12,701,332 B2
(45) Date of Patent: Aug. 4, 2026

(54) METHOD FOR TUNING ISP PIPELINE AND APPARATUS THEREOF

(71) Applicant: MEDIATEK INC., Hsinchu City (TW)

(72) Inventors: Ding-Yun Chen, Hsinchu City (TW);
Ying-Chun Tseng, Hsinchu City (TW);
Yi-Hsuan Huang, Hsinchu City (TW);
Yi-Ping Liu, Hsinchu City (TW);
Tsung-Han Chan, Hsinchu City (TW);
Cheng-Tsai Ho, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 53 days.

(21) Appl. No.: 19/002,762

(22) Filed: Dec. 27, 2024

(65) Prior Publication Data

US 2026/0189803 A1    Jul. 2, 2026

(51) Int. Cl.
| | |
|---|---|
| *H04N 23/80* | (2023.01) |
| *G06T 1/20* | (2006.01) |
| *G06T 5/00* | (2024.01) |
| *G06T 5/60* | (2024.01) |
| *G06T 5/70* | (2024.01) |
| *H04N 23/617* | (2023.01) |
| *H04N 23/81* | (2023.01) |
| *H04N 23/84* | (2023.01) |

(52) U.S. Cl.
CPC ............... *H04N 23/80* (2023.01); *G06T 1/20* (2013.01); *G06T 5/00* (2013.01); *G06T 5/60* (2024.01); *H04N 23/617* (2023.01); *G06T 5/70* (2024.01); *G06T 2207/20004* (2013.01); *G06T 2207/20081* (2013.01); *G06T 2207/20192* (2013.01); *H04N 23/81* (2023.01); *H04N 23/843* (2023.01)

(58) Field of Classification Search
None
See application file for complete search history.

(56) References Cited

U.S. PATENT DOCUMENTS

| | | | |
|---|---|---|---|
| 2019/0050682 A1* | 2/2019 | Sutic ...................... | G06F 18/254 |
| 2021/0021757 A1* | 1/2021 | Nakao .................. | H04N 23/667 |
| 2022/0164926 A1* | 5/2022 | Kurmanov ................ | G06T 5/70 |

(Continued)

FOREIGN PATENT DOCUMENTS

| | | | | | |
|---|---|---|---|---|---|
| CN | 116416482 A | * | 7/2023 | ............... | G06T 5/00 |
| WO | WO-2023215371 A1 | * | 11/2023 | ............... | G06T 5/70 |

OTHER PUBLICATIONS

J Nishimura, T Gerasimow, R Sushma, A Sutic, CT Wu, G Michael, "Automatic ISP image quality tuning using nonlinear optimization", 2018 25th IEEE International Conference on Image Processing (ICIP), 2018.

*Primary Examiner* — Paul M Berardesca
(74) *Attorney, Agent, or Firm* — Winston Hsu

(57) ABSTRACT

An ISP pipeline includes at least a first image processing module and a second image processing module. The method for tuning intermediate parameters in the ISP pipeline includes extracting a first set of intermediate image quality (IQ) features from the first intermediate image, extracting a first set of IQ features from a target image, generating a second set of IQ features according to the first set of IQ features, comparing the second set of IQ features with the first set of intermediate IQ features to generate a comparison result, and tuning a set of intermediate parameters associated with the first image processing module or the second image processing module according to the comparison result.

18 Claims, 5 Drawing Sheets

(56)  References Cited

U.S. PATENT DOCUMENTS

| | | | |
|---|---|---|---|
| 2022/0358627 A1* | 11/2022 | Deng | G06N 3/09 |
| 2022/0408012 A1* | 12/2022 | Hwang | H04N 23/62 |
| 2023/0087663 A1* | 3/2023 | Araki | H04N 23/90 |
| | | | 345/419 |
| 2023/0206401 A1* | 6/2023 | Liu | G06N 3/045 |
| | | | 382/157 |

* cited by examiner

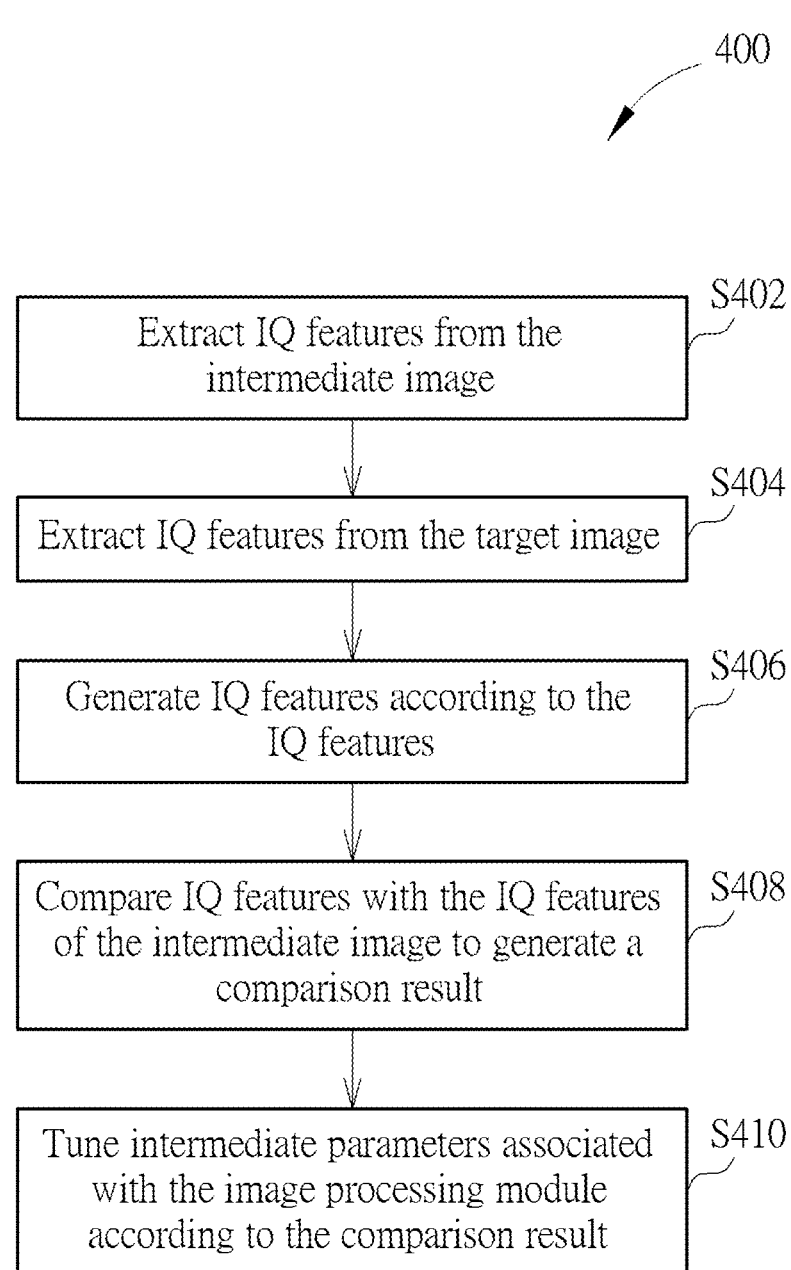

400

S402
Extract IQ features from the intermediate image

S404
Extract IQ features from the target image

S406
Generate IQ features according to the IQ features

S408
Compare IQ features with the IQ features of the intermediate image to generate a comparison result S410
Tune intermediate parameters associated with the image processing module according to the comparison result

FIG. 4

METHOD FOR TUNING ISP PIPELINE AND APPARATUS THEREOF

BACKGROUND

The proliferation of mobile devices has made cameras an integral part of our daily lives, with their importance extending far beyond simple photography. Modern cameras often incorporate image signal processors (ISPs) to enhance and optimize the captured images. Hardware ISPs are ubiquitous low-level image processing pipelines found in nearly all commodity cameras and a wide range of applications, including digital still photography, camera phones, video surveillance, robotics, driver assistance systems, and self-driving vehicles.

The primary function of an ISP is to transform RAW sensor data into images that are suitable for human vision or downstream analytic tasks. This transformation process typically involves several power-efficient processing blocks operating in real-time, which is crucial for applications in robotics and self-driving vehicles. As sensor resolutions continue to grow, efficient processing pipelines implemented in hardware become increasingly important to handle the vast amount of data captured by these high-resolution sensors.

Existing ISPs are often proprietary black box systems, providing limited information to users except for a set of registers with their operational ranges. The behavior of an ISP can be configured through a set of adjustable ISP parameters, making parameter tuning an essential aspect of camera image processing. The values assigned to these parameters not only affect the quality of the output image but also have a significant impact on domain-specific applications that rely on the processed images.

Traditionally, imaging experts manually tune the ISP parameters using a small dataset, relying on a combination of visual inspection and image quality metrics to assess the results. However, this approach has its limitations. The resulting handcrafted ISP parameters are often biased towards human perception, prioritizing visual aesthetics over the specific requirements of analytical higher-level vision tasks. While these manually tuned parameters may produce visually appealing images, they may not necessarily benefit downstream applications that rely on the processed images for tasks such as object detection, facial recognition, or autonomous navigation.

To address these challenges, there is a growing need for more intelligent and adaptive ISP parameter tuning methods. By leveraging advanced techniques such as machine learning and computer vision, it becomes possible to optimize ISP parameters not only for human perception but also for the specific requirements of various domain-specific applications. By training models on large datasets and incorporating feedback from downstream tasks, ISP parameters can be automatically tuned to enhance the performance of higher-level vision algorithms, ultimately leading to improved accuracy and efficiency in a wide range of applications.

Furthermore, the development of more transparent and configurable ISP architectures can empower users and researchers to have greater control over the image processing pipeline. By providing access to the internal workings of the ISP and allowing for fine-grained parameter adjustments, it becomes possible to tailor the image processing to the specific needs of different applications, enabling more specialized and optimized image enhancement techniques.

In modern image signal processors, the image processing pipeline is composed of several processing blocks or modules, each with its own set of high-level tunable parameters or intermediate parameters. To achieve the best possible image quality, it is essential to tune these parameters according to the capabilities and limitations of each individual image processing module. This optimization process ensures that the ISP pipeline leverages the full potential of each module and delivers the desired image quality.

To guarantee that the image quality at the end of an ISP pipeline aligns with the target image quality, it is crucial to assess the image quality at intermediate stages of the pipeline. One approach is to compare the image quality features of the image at the end of the ISP pipeline with the image quality features of the target image. By analyzing and comparing these features, discrepancies or areas requiring further optimization can be identified. This comparison allows for a systematic evaluation of the ISP pipeline's performance and guides the parameter tuning process. Through iterative adjustments of the parameters based on the identified differences in image quality features, the ISP pipeline can be fine-tuned to progressively align the output image quality with the desired target image quality, ultimately delivering the best possible results.

The parameter settings applied after the current tuning module significantly impact the image quality at the end of the ISP pipeline. An alternative approach to assessing the pipeline's performance is to compare the image quality features of the output image from the last image processing module with the image quality features of the target image. However, it is important to note that the target image is the result of a complete, separate ISP pipeline and not an intermediate stage of the pipeline being tuned. This distinction should be considered when making comparisons and adjustments to ensure that the tuning process accurately aligns the output image quality with the desired target image quality.

The parameter settings applied after the current tuning module significantly impact the image quality at the end of the ISP pipeline.

An alternative approach to assessing the pipeline's performance is to compare the image quality features of the output image from the last image processing module and the image quality features of the target image. However, it is important to note that the target image is the result of a complete, separate ISP pipeline and not an intermediate stage of the pipeline being tuned.

SUMMARY

An embodiment provides a method for tuning intermediate parameters in an image signal processing (ISP) pipeline. The ISP pipeline comprises at least a first image processing module and a second image processing module. The method comprises extracting a first set of intermediate image quality (IQ) features from the first intermediate image, extracting a first set of IQ features from a target image, generating a second set of IQ features according to the first set of IQ features, comparing the second set of IQ features with the first set of intermediate IQ features to generate a comparison result, and tuning a set of intermediate parameters associated with the first image processing module or the second image processing module according to the comparison result.

An embodiment provides an apparatus for tuning intermediate parameters in an image signal processing (ISP) pipeline. The apparatus comprising one or more electronics or processors arranged to extract a first set of intermediate image quality (IQ) features from the first intermediate image, extract a first set of IQ features from a target image, generate a second set of IQ features according to the first set of IQ features, compare the second set of IQ features with the first set of intermediate IQ features to generate a comparison result, and tune a set of intermediate parameters associated with the first image processing module or a second image processing module in the ISP pipeline according to the comparison result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flowchart of a method for tuning intermediate parameters in an ISP pipeline.

DETAILED DESCRIPTION

Figure 1:
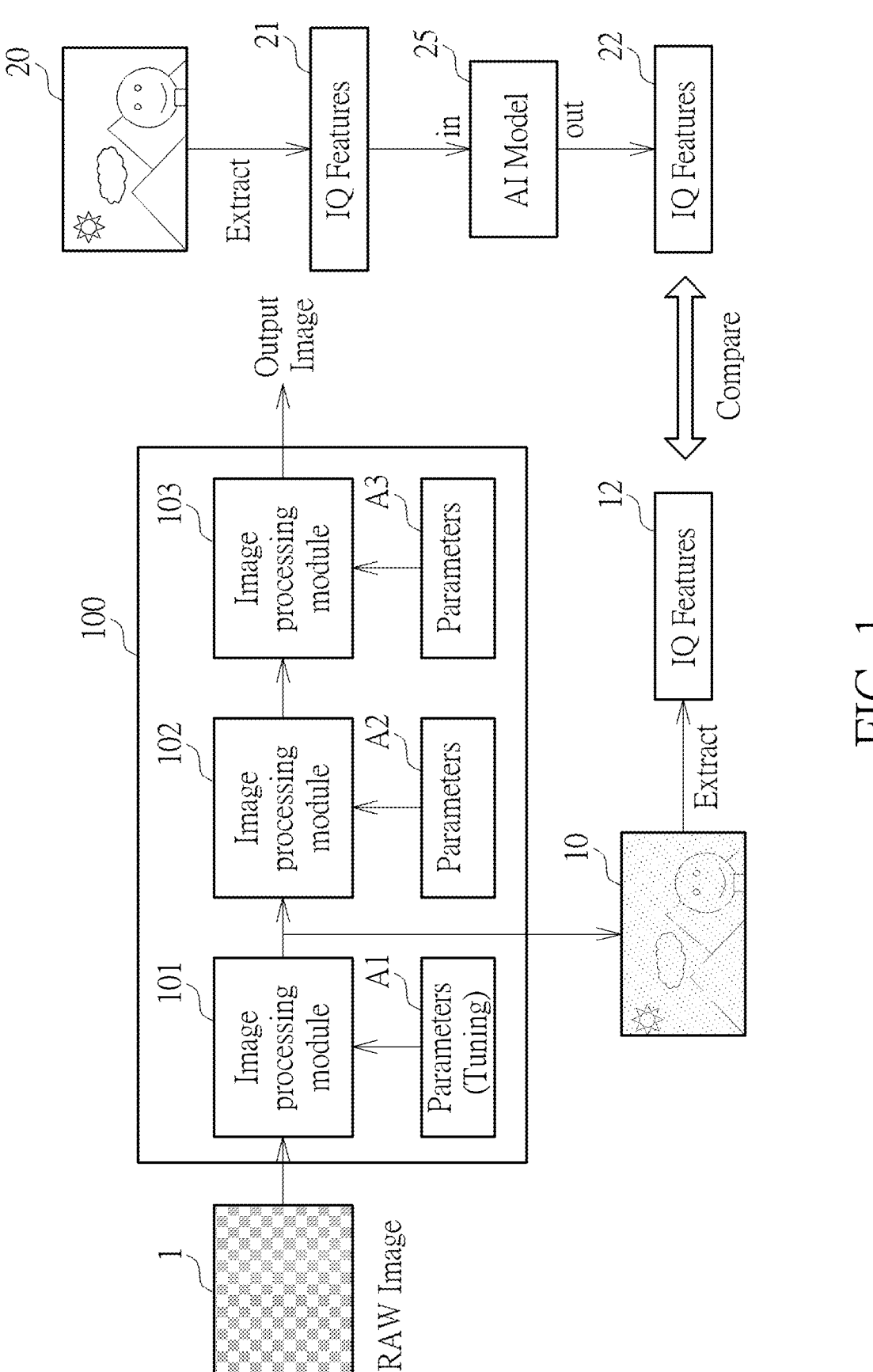
FIG. 1 illustrates an embodiment of tuning intermediate parameters in an ISP pipeline.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. In this specification, technical features that are individually described within one drawing may be implemented individually or simultaneously.

An image signal processor (ISP) is a crucial component in digital cameras that interprets the optical signal captured by the sensor and processes the colors. It performs various functions, including noise reduction, edge enhancement, dynamic range processing, and applying adjustments and filters. The ISP has a significant impact on the perception of an image, transforming a RAW image from the sensor into a processed image. The tuning parameters of each image processing module within the ISP can be factory-based or upgradable by product manufacturers. To achieve the best image quality (IQ), which encompasses aspects such as noise, texture, artifacts, tone, contrast, dynamic range, color, and brightness, these parameters must be carefully tuned.

Image quality can be assessed using image features obtained through feature extraction, which can be performed using artificial intelligence (AI) or traditional (non-AI) methods. Different image features are represented by different image quality indexes (IQIs). For instance, noise is an IQI that can be represented by image features like standard deviation in flat regions. Various types of noise, such as edge noise, spot noise, low and high frequency noise, and banding noise, require distinct image features for representation or description.

These image quality indexes can be enhanced by different image processing algorithms in intermediate ISP pipeline. Different types of artifacts, such as pattern noise, overshoot/undershoot, contour, ghost, etc., require different image feature to represent or describe. Furthermore, tone is another image quality index. Different types of tones, such as contrast, detail in bright region, detail in dark region, etc., also require different image features to represent or describe.

Each intermediate image processing module has different image processing capacity and limitation. Each stage (or image processing module) in the ISP pipeline needs to reach certain levels of image features to achieve the output image features.

In order for the image quality of an output image output by an ISP pipeline to be aligned with the image quality of a target image (from any source), the certain level of image quality at the middle of the ISP pipeline needs to be satisfied. Therefore, to align the image quality of the target image with the image quality of the output image, it is necessary to have image quality features extracted and predicted from the target image using an AI model and to tune the ISP pipeline accordingly. The AI model can be a deep learning network model for processing the image features from the target image. It can work backwards to determine the desired image features of an output image from an intermediate image processing module in the ISP pipeline. This is done to ensure that the output image of the ISP pipeline can closely match the image quality and style of the target image.

FIG. 1 illustrates an embodiment of tuning intermediate parameters in an ISP pipeline 100. The ISP pipeline 100 includes image processing modules 101 and 102. A set of intermediate parameters A1 is associated with the image processing modules 101, and another set of intermediate parameters A2 is associated with the image processing modules 102. The ISP pipeline 100 can optionally include an image processing module 103 and its associated set of intermediate parameters A3. The image processing module 101 can generate an intermediate image 10 according to a RAW image 1. A set of image quality (IQ) feature 12 of the intermediate image 10 can then be extracted.

It should be noted that the ISP pipeline 100 can include more image processing modules, each having similar or different capability. The invention is not limited thereto.

The image quality of the output of the ISP pipeline 100 may be required to be aligned with the image quality of the target image 20. The IQ features 21 can be extracted from the target image 20. Then, the extracted IQ features 21 can be fed into an AI model 25 (e.g., a deep learning network) to generate IQ features 22. The IQ features 22 are the IQ features predicted for the intermediate image 10 such that the image quality of the intermediate image 10 can be aligned with the image quality of the target image 22. Next, the IQ features 22 can then be compared with the set of IQ feature 12. Then, the intermediate parameters A1 can be tuned according to the comparison result.

In some embodiments, the intermediate parameters A2 associated with the image processing module 102 can be tuned according to the comparison result. The invention is not limited thereto.

The above described process may be an iterative process. Iterations may be necessary to tune the intermediate parameters A1 in order for the IQ feature 12 to get a close enough approximation to the IQ feature 22. As a result, the IQ features of the output image of the ISP pipeline 100 can be a close enough approximation to the IQ features 21 of the target image 20.

The target image 20 may be produced from an iPhone or any smartphone, a previous customer project, a high-end camera, etc. In other words, the target image 20 is generated by a different ISP pipeline. That is, the target image 20 is not generated by the ISP pipeline 100.

In some embodiments, a single ISP pipeline can be used with various input image sensors, following the process outlined earlier. This means that the same ISP pipeline can be adapted to work with different image sensors while still adhering to the described optimization and tuning procedures.

However, it is important to note that the invention is not restricted solely to the use of different ISP pipelines, as mentioned in the previous description. The flexibility of the invention allows for the possibility of using a single ISP pipeline that can accommodate multiple image sensors, depending on the specific requirements and constraints of the imaging system.

By leveraging a single ISP pipeline that can work with different input image sensors, the invention offers benefits such as cost-effectiveness, consistency in image processing, scalability, and improved efficiency in development and implementation.

The adaptability of the ISP pipeline to various image sensors showcases the versatility and robustness of the invention in optimizing image quality across a range of imaging devices and scenarios, while not being limited to the exclusive use of different ISP pipelines as initially described.

Figure 2:
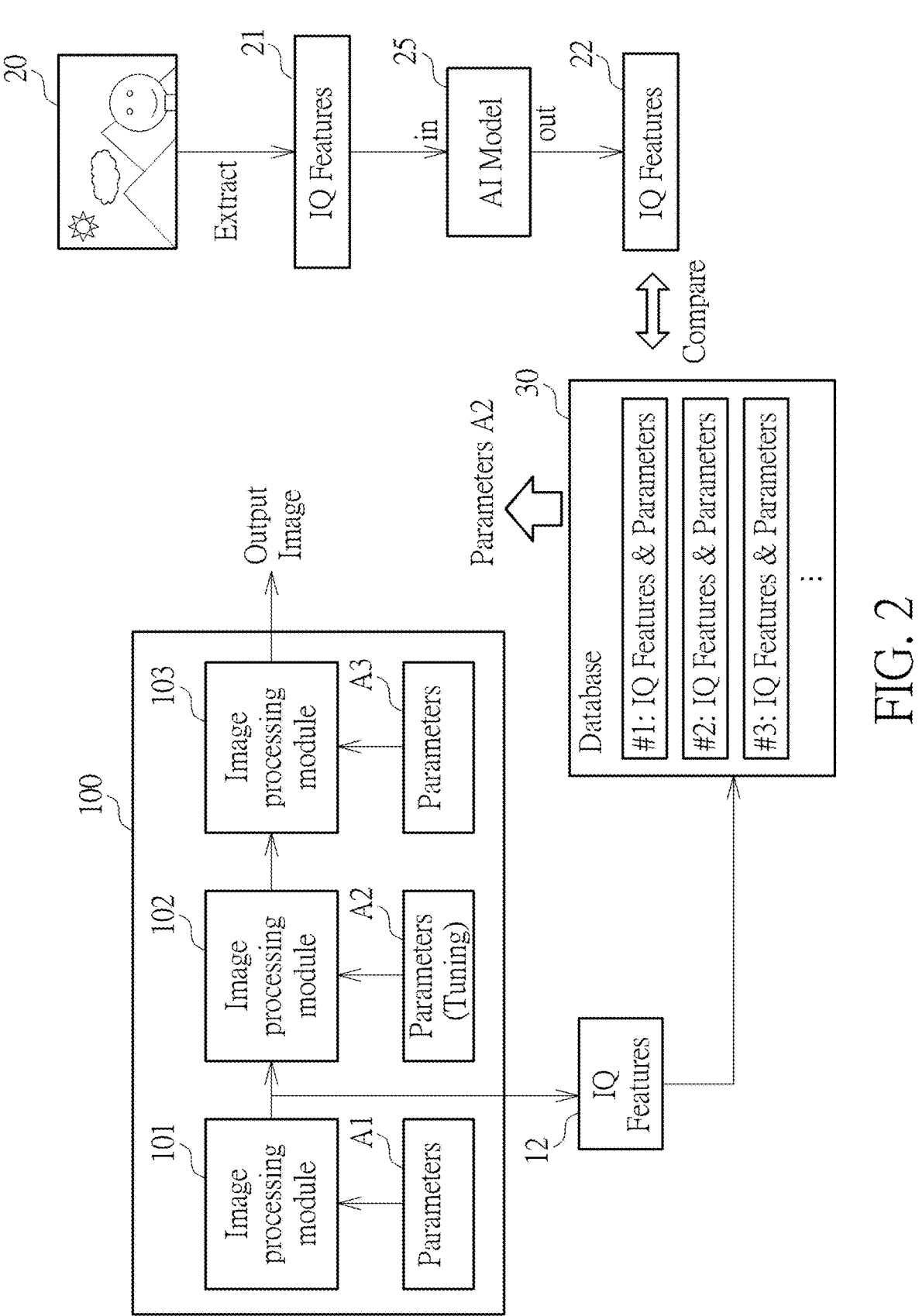
FIG. 2 illustrates another embodiment of tuning intermediate parameters in an ISP pipeline.

FIG. 2 illustrates another embodiment of tuning intermediate parameters in an ISP pipeline 100. The embodiment of FIG. 2 is similar to the embodiment of FIG. 1, except that the embodiment of FIG. 2 further includes a (predetermined) database 30 which stores a plurality of sets of IQ features and corresponding sets of intermediate parameters. Moreover, the intermediate image (e.g., from an image sensor) can input into the ISP pipeline 100 directly before the image processing module 102. The set of image quality (IQ) features 12 of the intermediate image 10 can then be extracted.

The IQ features 22 can be generated according to the same procedure as described. Next, the IQ features 22 can then be compared with the set of IQ features 12. Then, the intermediate parameters A2 can be obtained from the database 30 according to the IQ features 12 comparing with the IQ features 22. The intermediate parameters A2 can be selected from one or more sets of the IQ features and the associated intermediate parameters in the database 30 so that the IQ features of the output image of the ISP pipeline 100 would be a close enough approximation to the IQ features 21 of the target image 20.

In some embodiments, the intermediate parameters A1 can be obtained from the database 30 according to the IQ features 12 and the IQ features 22. The intermediate parameters A1 can be selected from one or more sets of the IQ features and the associated intermediate parameters in the database 30 so that the IQ features of the output image of the ISP pipeline 100 would be a close enough approximation to the IQ features 21 of the target image 20.

In some embodiments, the intermediate parameters A1 or A2 can be derived from one or more sets of image quality (IQ) features and their associated intermediate parameters. These selected intermediate parameters can then be interpolated or extrapolated to estimate the IQ features of the target image.

Interpolation and extrapolation are mathematical techniques used to estimate values within or beyond a given set of data points. In the context of this invention, these techniques are applied to the intermediate parameters and their associated IQ features to approximate the desired IQ features of the target image.

The use of interpolation and extrapolation techniques allows the invention to leverage existing sets of IQ features and intermediate parameters to estimate the necessary parameters for achieving the desired IQ features in the target image. This approach enhances the flexibility and adaptability of the invention, enabling it to handle a wide range of target image characteristics and requirements.

Figure 3:
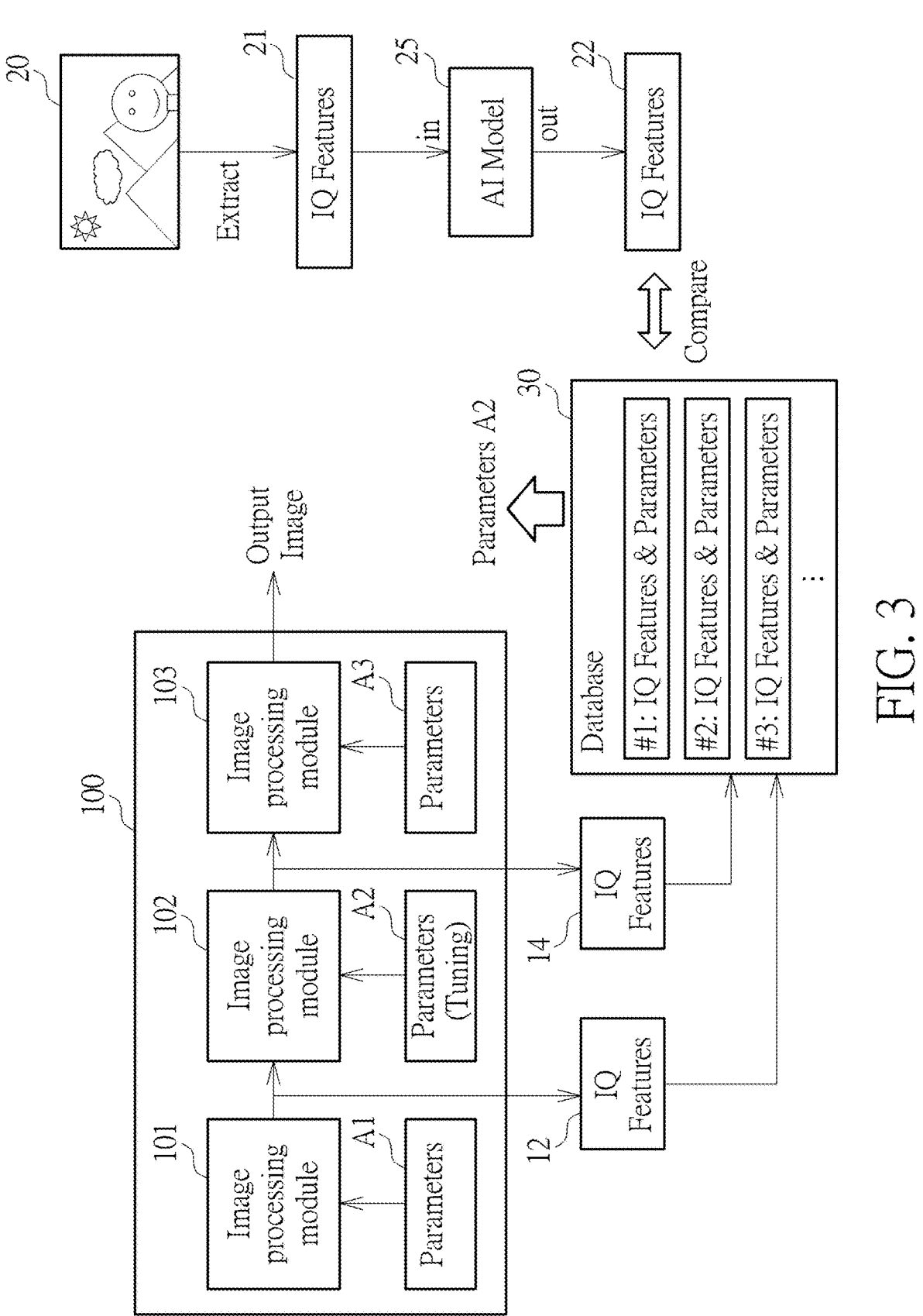
FIG. 3 illustrates another embodiment of tuning intermediate parameters in an ISP pipeline.

FIG. 3 illustrates another embodiment of tuning intermediate parameters in an ISP pipeline 100. The embodiment of FIG. 3 is similar to the embodiment of FIG. 2, except that IQ features 14 can be further introduced to assist selecting parameters A2. The IQ features 12 are the IQ features extracted from the intermediate image before being processed by the image processing module 102, while the IQ features 14 are the IQ features extracted from the intermediate image processed by the image processing module 102. The intermediate parameters A2 can be obtained from the database 30 according to the IQ features 12 and 14 comparing with the IQ features 22. The intermediate parameters A2 can be selected from one or more sets of the IQ features and the associated intermediate parameters in the database 30 so that the IQ features of the output image of the ISP pipeline 100 would be a close enough approximation to the IQ features 21 of the target image 20.

Similarly, in certain embodiments, the intermediate parameters A2 can be derived from one or more sets of image quality (IQ) features and their associated intermediate parameters. These selected intermediate parameters can then be interpolated or extrapolated to estimate the IQ features of the target image.

FIG. 4 is a flowchart of a method 400 for tuning intermediate parameters in an ISP pipeline 100. The method 400 includes the following steps:

S402: Extract IQ features 12 from the intermediate image 10;

S404: Extract IQ features 21 from the target image 20;

S406: Generate IQ features 22 according to the IQ features 21;

S408: Compare IQ features 22 with the IQ features 12 of the intermediate image 10 to generate a comparison result; and S410: Tune intermediate parameters A1 associated with the image processing module 101 according to the comparison result.

In some embodiments, the method can be used to tune intermediate parameters A2 associated with the image processing module 102 instead.

In some embodiments, the database 30 is implemented for selecting IQ features and the associated intermediate parameters as previously described.

In some embodiments, the target image 20 may not need to be input manually. Instead, the camera device may automatically collect and process images with preferred image quality and style. Then, the above described processes can be implemented to align the IQ features of the output image of the ISP pipeline 100 and the target image 20.

Figure 5:
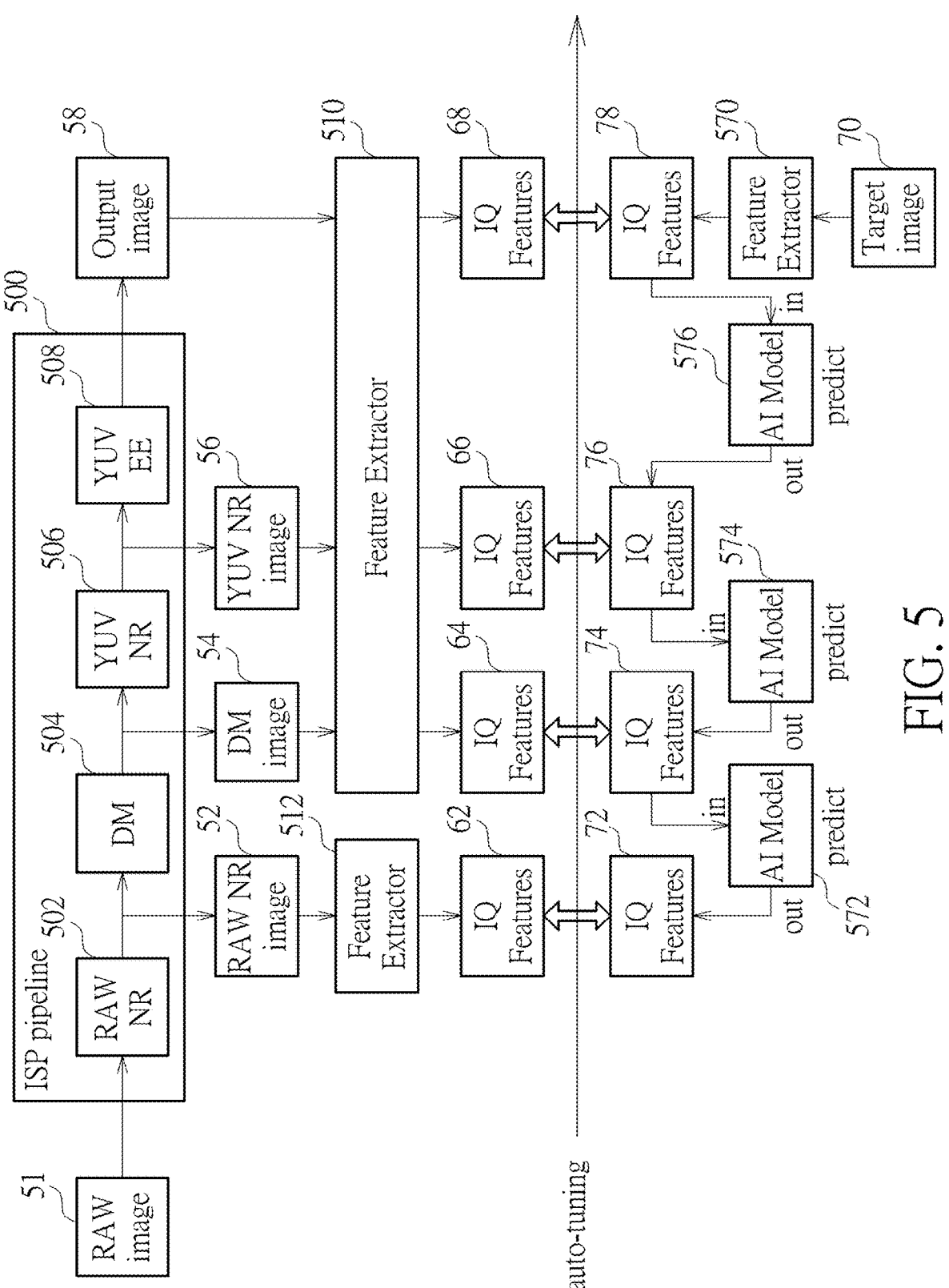
FIG. 5 illustrates an embodiment of tuning intermediate parameters in an ISP pipeline.

FIG. 5 illustrates an embodiment of tuning intermediate parameters in an ISP pipeline 500. The ISP pipeline 500 may include a RAW noise reduction (NR) module 502, a demosaic module (DM) 504, YUV NR module 506, and YUV edge enhancement (EE) module 508. The RAW NR module 502 generates a RAW NR image 52 according to the RAW image 51. The demosaic module 504 generates a DM image 54 according to the RAW NR image 52. The YUV NR module 506 generates a YUV NR image 56 according to the DM image 54. The YUV EE module 508 generates an output image 58 according to the YUV NR image 56.

The output image 58 can be fed into a feature extractor 510 to generate IQ features 68. Similarly, the YUV NR image 56 and the DM image 54 can be fed into the feature extractor 510 to respectively generate IQ features 66 and 64. Also, the RAW NR image 52 can be fed into another feature extractor 512 to generate IQ features 62.

The IQ features 78 can be extracted from a target image 70 by the feature extractor 570. The IQ features 78 then can be fed into the AI model 576 to generate (or predict) IQ features 76 accordingly. Next, the IQ features 76 can be fed into the AI model 574 to generate IQ features 74 accordingly. Similarly, the IQ features 74 then can be fed into the AI model 572 to generate IQ features 72 accordingly.

Furthermore, the IQ features 62, 64, 66 and 68 can be compared with IQ features 72, 74, 76 and 78 respectively to generate comparison results and tune the intermediate parameters of the ISP pipeline 500 by the process described previously. The result of the tuning is that the IQ features 68 of the output image 58 can be aligned with the IQ features 78 of the target image 70.

For training the AI models, the IQ features 68 can be fed into the AI model 576 for training purpose. The IQ features 66 can be fed into the AI model 574 for training purpose. The IQ features 64 can be fed into the AI model 572 for training purpose. The training of the AI models 572, 574 and 576 can be done by the various known methods. Thus, the description will not be repeated here for brevity.

In some embodiments, a single set of image quality (IQ) features, namely IQ features 78, can be directly used as input for multiple AI models, such as AI models 576, 574, and 572. This approach differs from feeding different IQ features to each AI model. By directly inputting the IQ features 78 into AI model 576, the model can generate the corresponding IQ features 76. Similarly, the same IQ features 78 can be fed into AI model 574 to produce IQ features 74, and into AI model 572 to generate IQ features 72.

In some embodiments, only two sets of IQ features (e.g., IQ features 64 and 74) are used for comparison in tuning the ISP pipeline 500. These two sets of IQ features may be key features to tune the ISP pipeline for the aforementioned alignment. By focusing on these two essential sets of IQ features, the tuning process can be streamlined and simplified. The comparison between IQ features 64 and 74 provides sufficient information to make necessary adjustments and optimizations to the ISP pipeline 500, ensuring that the desired image quality is achieved. Limiting the comparison to these key features reduces the complexity of the tuning process, as it eliminates the need to consider and analyze a larger number of IQ feature sets. This targeted approach allows for more efficient and effective tuning of the ISP pipeline, as the critical aspects of image quality are prioritized and aligned based on the comparison of IQ features 64 and 74.

In some embodiments, a single AI model (e.g., AI model 576) is used to generate IQ features 76, 74 and 72 accordingly. In other words, the IQ feature 76 can be generated by the AI model 576 according to the IQ features 78; the IQ features 74 can be generated by the same AI model 576 according to the IQ features 76; the IQ features 72 can be generated by the same AI model 576 according to the IQ features 74.

In other words, the process begins with the AI model 576 taking the IQ features 78 as input and generating the corresponding IQ features 76 as output. This means that the AI model 576 learns the relationship between the input IQ features 78 and the desired output IQ features 76, and uses this learned relationship to predict or generate the IQ features 76 based on the given input. Next, the same AI model 576 is used to generate the IQ features 74. In this step, the previously generated IQ features 76 serve as the input to the AI model 576. The model then applies its learned relationship to predict or generate the corresponding IQ features 74 based on the input IQ features 76. Finally, the AI model 576 is employed once again to generate the IQ features 72. The input to the model in this step is the previously generated IQ features 74. The AI model 576 utilizes its learned relationship to predict or generate the IQ features 72 based on the input IQ features 74.

In some embodiments, a single AI model (e.g., model 576) is utilized to generate multiple sets of image quality (IQ) features. This means that the AI model 576 can generate IQ features 76, 74, and 72 directly from the input IQ features 78, without relying on sequential generation from each other.

The AI model 576 is trained to understand the complex relationships between the input IQ features 78 and each desired set of output IQ features (76, 74, and 72). By learning from numerous examples of input and output features, the model can predict or generate the required IQ features based solely on the input IQ features 78.

This approach simplifies the system architecture by using a single AI model for direct generation of IQ features, eliminating the need for multiple models or complex pipelines. It improves efficiency by reducing computational overhead and latency associated with sequential generation. Moreover, the AI model can be easily adapted to accommodate different image processing requirements or incorporate new IQ features, providing flexibility in generating desired IQ features for various tasks.

The terminology used in the description of the various embodiments herein is for the purpose of describing particular embodiments only and is not intended to be limiting. In the description of the various embodiments and the appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The terms "coupled," "connected," "connecting," and "electrically connected" are used interchangeably in this document to refer to the state of being electrically or electronically connected. Similarly, a first entity is considered to be in "communication" with a second entity (or entities) when the first entity electrically sends and/or receives information signals to/from the second entity, regardless of whether the signals contain voice information or non-voice data/control information, and irrespective of the type of signals (analog or digital). It should be noted that the various figures, including component diagrams, shown and discussed in this document are for illustrative purposes only and are not drawn to scale.

The various illustrative components, logic, logical blocks, modules, circuits, operations and algorithm processes described in connection with the embodiments disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative components, logic, logical blocks, modules, circuits, operations, and algorithm processes described in connection with the embodiments disclosed herein may be implemented as electronic hardware, firmware, software, or combinations thereof, including the structures disclosed in this specification and their structural equivalents. The interchangeability of hardware, firmware, and software has been described generally in terms of functionality and illustrated in the various illustrative components, blocks, modules, circuits, and processes described above. The choice of implementing such functionality in hardware, firmware, or software depends on the particular application and design constraints imposed on the overall system.

The hardware and data processing apparatus used to implement the various illustrative components, logics, logical blocks, modules, and circuits described in connection with the aspects disclosed herein may be implemented or performed with a general-purpose single-chip or multi-chip processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor or any conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration. In some embodiments, specific processes, operations, and methods may be performed by circuitry that is dedicated to a particular function.

As described above, in some aspects embodiments of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

While some embodiments comprise the disclosed features and may therefore include additional features not specifically described, other embodiments may be essentially free of or completely free of non-disclosed elements. That is, non-disclosed elements may optionally be essentially omitted or completely omitted.

Additionally, various features that are described in this specification in the context of separate embodiments also can be implemented in combination in a single implementation. Conversely, various features that are described in the context of a single implementation also can be implemented in multiple embodiments separately or in any suitable sub-combination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described should not be understood as requiring such separation in all embodiments, and it should be understood that the described program components and systems can generally be integrated together in a single software package or multiple software packages. Additionally, other embodiments are within the scope of the following claims. In some cases, the actions recited in the claims can be performed in a different order and still achieve desirable results.

Various modifications to the embodiments described in this disclosure may be readily apparent to persons having ordinary skill in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for tuning intermediate parameters in an image signal processing (ISP) pipeline, the ISP pipeline comprising at least a first image processing module and a second image processing module, the method comprising:

extracting a first set of intermediate image quality (IQ) features from a first intermediate image;

extracting a first set of IQ features from a target image;

generating a second set of IQ features according to the first set of IQ features;

comparing the second set of IQ features with the first set of intermediate IQ features to generate a comparison result; and tuning a set of intermediate parameters associated with the first image processing module or the second image processing module according to the comparison result.

2. The method of claim 1 further comprising capturing a RAW image with an image sensor, and processing the RAW image by the first image processing module to generate the first intermediate image.

3. The method of claim 1 further comprising after tuning the set of intermediate parameters, generating an output image by the ISP pipeline from a RAW image.

4. The method of claim 1, wherein generating the second set of IQ features according to the first set of IQ features is generating the second set of IQ features according to the first set of IQ features with at least one artificial intelligence (AI) model.

5. The method of claim 4, wherein the at least one AI model is at least one deep learning network.

6. The method of claim 1, wherein tuning the set of intermediate parameters associated with the first image processing module or the second image processing module according to the comparison result comprises obtaining a set of intermediate parameters most relevant to the comparison result from a database comprising a plurality sets of IQ features and corresponding sets of intermediate parameters.

7. The method of claim 1, wherein the ISP pipeline further comprises a third image processing module, and the method further comprises:

processing the first intermediate image by the second image processing module to generate a second intermediate image;

extracting a second set intermediate of IQ features from the second intermediate image;

comparing the second set of IQ features with the second set of intermediate IQ features to generate another comparison result; and tuning a set of intermediate parameters associated with the second image processing module according to the another comparison result.

8. The method of claim 7, wherein tuning the set of intermediate parameters associated with the second image processing module according to the another comparison result comprises obtaining the set of intermediate parameters associated with the second image processing module most relevant to the another comparison result from a database which comprises a plurality sets of IQ features and corresponding sets of intermediate parameters.

9. The method of claim 1, wherein the first image processing module and/or the second image processing module has an algorithm performing demosaic, noise reduction or edge enhancement.

10. An apparatus for tuning intermediate parameters in an image signal processing (ISP) pipeline, the apparatus comprising one or more electronics or processors, arranged to:

extract a first set of intermediate image quality (IQ) features from a first intermediate image;

extract a first set of IQ features from a target image;

generate a second set of IQ features according to the first set of IQ features;

compare the second set of IQ features with the first set of intermediate IQ features to generate a comparison result; and tune a set of intermediate parameters associated with a first image processing module or a second image processing module in the ISP pipeline according to the comparison result.

11. The apparatus of claim 10 further comprising an image sensor configured to capture a RAW image, and the apparatus is further arranged to process the RAW image by a first image processing module in the ISP pipeline to generate the first intermediate image.

12. The apparatus of claim 10, wherein the apparatus is further arranged to generate an output image with the ISP pipeline from the first image after tuning the set of intermediate parameters.

13. The apparatus of claim 10, wherein the second set of IQ features is generated according to the first set of IQ features with at least one artificial intelligence (AI) model.

14. The apparatus of claim 13, wherein the at least one AI model is at least one deep learning network.

15. The apparatus of claim 10, wherein the set of intermediate parameters associated with the first image processing module or the second image processing module is tuned by obtaining a set of intermediate parameters most relevant to the comparison result from a database comprising a plurality sets of IQ features and corresponding sets of intermediate parameters.

16. The apparatus of claim 10, wherein apparatus is further arranged to:

process the first intermediate image by the second image processing module to generate a second intermediate image;

extract a second set intermediate of IQ features from the second intermediate image;

compare the second set of IQ features with the second set intermediate IQ features to generate another comparison result; and tune a set of intermediate parameters associated with the second image processing module according to the another comparison result.

17. The apparatus of claim 16, wherein:

the set of intermediate parameters associated with the second image processing module is tuned by obtaining a set of intermediate parameters associated with the second image processing module most relevant to the another comparison result from a database comprising a plurality sets of IQ features and corresponding sets of intermediate parameters.

18. The apparatus of claim 10, wherein the first image processing module and/or the second image processing module has an algorithm performing demosaic, noise reduction or edge enhancement.

\* \* \* \* \*